(12) United States Patent
Billot

(10) Patent No.: US 9,004,034 B2
(45) Date of Patent: Apr. 14, 2015

(54) REDUCING GEAR AND STARTER DEVICE OF AN INTERNAL COMBUSTION ENGINE

(75) Inventor: Samuel Billot, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 967 days.

(21) Appl. No.: 13/120,801

(22) PCT Filed: Sep. 28, 2009

(86) PCT No.: PCT/EP2009/062489
§ 371 (c)(1), (2), (4) Date: Mar. 24, 2011

(87) PCT Pub. No.: WO2010/034829
PCT Pub. Date: Apr. 1, 2010

(65) Prior Publication Data
US 2011/0168116 A1   Jul. 14, 2011

(30) Foreign Application Priority Data

Sep. 29, 2008 (DE) .......... 10 2008 042 431

(51) Int. Cl.
| | |
|---|---|
| F02N 15/04 | (2006.01) |
| F16H 1/28 | (2006.01) |
| F16H 55/08 | (2006.01) |
| F02N 15/06 | (2006.01) |
| F16H 57/00 | (2012.01) |

(52) U.S. Cl.
CPC .......... *F02N 15/046* (2013.01); *F02N 15/063* (2013.01); *F02N 15/066* (2013.01); *F16H 1/28* (2013.01); *F16H 55/0806* (2013.01); *F16H 57/0006* (2013.01)

(58) Field of Classification Search
CPC .......... F02N 15/046; F02N 15/063–15/064; F02N 15/066; F16H 55/0806
USPC .......... 123/179.1; 290/38 R; 74/7 E
See application file for complete search history.

(56) References Cited

U.S. PATENT DOCUMENTS

| | | | |
|---|---|---|---|
| 4,276,785 A | 7/1981 | Rouverol | |
| 4,640,149 A | 2/1987 | Drago | |
| 6,080,199 A | 6/2000 | Umeyama et al. | |
| 2001/0008860 A1* | 7/2001 | Niimi et al. .......... | 475/344 |
| 2003/0097891 A1* | 5/2003 | Siems et al. .......... | 74/6 |
| 2004/0187615 A1* | 9/2004 | Murata et al. .......... | 74/7 E |

(Continued)

FOREIGN PATENT DOCUMENTS

| | | |
|---|---|---|
| DE | 4308914 | 9/1993 |
| DE | 4308914 A1 * | 9/1993 |

(Continued)

OTHER PUBLICATIONS

PCT/EP2009/062489 International Search Report.

*Primary Examiner* — Hieu T Vo
*Assistant Examiner* — Arnold Castro
(74) *Attorney, Agent, or Firm* — Michael Best & Friedrich LLP

(57) ABSTRACT

The invention relates to a reducing gear (3), in particular for a starter device (1) of an internal combustion engine, for speed-reducing coupling of a drive shaft and a driven shaft (5, 7), said coupling accomplished by way of at least two toothed gears (11) that engage with one another. The toothed gears (11) comprise straight cogs, and the cogging (30) is extra deep cogging (31). The invention further relates to a starter device (1) of an internal combustion engine.

18 Claims, 3 Drawing Sheets

(56) References Cited

U.S. PATENT DOCUMENTS

| | | | |
|---|---|---|---|
| 2004/0211273 A1* | 10/2004 | Okumoto et al. | 74/7 R |
| 2005/0020401 A1 | 1/2005 | Ando et al. | |
| 2005/0076727 A1 | 4/2005 | Hasegawa et al. | |
| 2007/0078038 A1 | 4/2007 | Ando et al. | |
| 2007/0295119 A1* | 12/2007 | Metral | 74/7 E |

FOREIGN PATENT DOCUMENTS

| | | |
|---|---|---|
| DE | 102005061669 | 7/2006 |
| EP | 0086494 A1 * | 8/1983 |
| JP | 7253147 | 10/1995 |
| JP | 7332467 | 12/1995 |
| JP | 7332469 | 12/1995 |
| JP | 8105513 | 4/1996 |
| JP | 8219257 | 8/1996 |
| JP | 9280145 | 10/1997 |
| JP | 2002130097 | 5/2002 |
| JP | 2002276772 | 9/2002 |
| JP | 2005042874 | 2/2005 |
| JP | 2005054972 | 3/2005 |
| JP | 2006207573 | 8/2006 |

* cited by examiner

REDUCING GEAR AND STARTER DEVICE OF AN INTERNAL COMBUSTION ENGINE

BACKGROUND OF THE INVENTION

The invention relates to a reducing gear, in particular for a starter device of an internal combustion engine, for speed-reducing coupling of a drive shaft and a driven shaft, by means of at least two gearwheels which engage with one another. The invention also relates to a starter device of an internal combustion engine.

Reducing gears of the type mentioned at the beginning are known from the prior art. They are frequently used in starter devices of internal combustion engines to increase the torque, for example of an electric motor, as a result of which the overall size of the electric motor is kept small and its weight is kept low. If the internal combustion engine is to be started, the electric motor whose torque is reduced by means of the reducing gear—by reducing the speed and thereby setting the internal combustion engine in motion—is operated for this purpose. Starting from a speed which is dependent on the internal combustion engine used, the internal combustion engine can enter an independent operating mode. This procedure at the starting of the internal combustion engine is necessary since internal combustion engines are usually not capable of self-starting. Frequently, gearwheels with conventional toothing are used for the reducing gear, for example a planetary gear mechanism. This has the disadvantage that during the operation vibrations are excited, which results in poor acoustic properties of the reducing gear. The noises which are produced as a result can in certain cases be comparatively loud and therefore disruptive. In order to prevent the production of these vibrations, a helical toothing has now come to be provided for the reducing gear in some cases. This measure improves the engagement conditions and prevents the production of vibrations and the associated noise level. This means improved acoustic properties. However, the helical toothing also means that axial thrust forces act on the gearwheels which are equipped with the helical toothing. As a result of this, the corresponding bearing arrangement of the gearwheels or of the shafts associated with the gearwheels has to be provided depending on the thrust forces which are produced. The rigidity of the housing must also be configured taking into account the thrust forces. This gives rise to a complex design of the bearings and of the housing, which results in an increase in costs. Also, relatively high friction is present at the gearwheels with helical toothing, with the result that the efficiency of the reducing gear is worsened and therefore the power of the starter is reduced. This means that the starter capability of the starter device or of the electric motor is reduced. For this reason, the power of the electric motor must be increased in order to obtain the necessary starting capability. This in turn causes the wear of the electric motor to increase, in particular the wear of the commutation system, and therefore reduces the service life of the electric motor. Furthermore, there would be the possibility of providing the gearwheels with a double helical toothing. This prevents the occurrence of axial thrust forces acting on a bearing since said forces are taken up by the toothing itself. However, the double helical toothing results in the occurrence of further frictional forces and therefore in a further reduction in the efficiency. The fabrication is also complex and therefore expensive. The advantageous vibration behavior of the helical toothing or of the double helical toothing therefore entails a worsening of the efficiency and a more complex design.

SUMMARY OF THE INVENTION

In contrast with the above, the reducing gear has the advantage that the noise behavior and the vibration behavior of the reducing gear is improved, while the high level of efficiency of the straight-cut toothing is essentially retained. Further objectives of the invention are to achieve a compact design, a considerably increased service life and a cost-effective configuration of the reducing gear. This is achieved by virtue of the fact that the gearwheels have straight-cut toothing and the toothing is extra deep toothing. There is also provision for the reducing gear, which is configured, in particular, as a planetary gear mechanism and serves to reduce the speed of an electric motor and to transmit the torque thereof to an output shaft of a starter, is provided with an optimized toothing. The toothing here can have a special profile in order to reduce the noise level at the reducing gear, which noise level is produced, for example, during a starting process of the internal combustion engine. This configuration of the reducing gear has the advantage that as a result the optimized toothing is significantly quieter during operation, that is to say has improved acoustic properties. Furthermore, a compact and cost-saving design is possible. The latter is achieved, in particular, through the use of a straight-cut toothing. As a result, no axial forces, which have to be taken up by means of structural measures of the reducing gear, are produced. The bearing arrangement of the drive shaft and of the driven shaft or of the gearwheels can therefore be configured in such a way that no axial forces, or only low axial forces are taken up. As a result, a housing of the reducing gear can also be of more lightweight and space-saving design. The improvement of the acoustic properties is achieved by virtue of the fact that the toothing is configured as an extra deep toothing. As a result, the coverage of the toothing can be significantly increased, which results in an improved noise behavior and vibration behavior. As a result of the reduced vibrations, the service life of the resulting toothing of the reducing gear is positively influenced. The toothing is to be configured here in an application-friendly fashion, in particular with regard to the torques or speeds which are to be transmitted. Extra deep toothing is understood to be a toothing in which the coverage of the toothing is increased (greater than or equal to 2.0) by virtue of the fact that the normal intervention angle is reduced (less than 20°). This results in steeper edges, a larger profile coverage and smaller radial forces which act on the bearing arrangement of the gearwheels. Compared to a conventional geometry, the extra deep toothing is therefore less sensitive to wheel base deviations and out-of-true running errors, and the running is also made smoother. Compared to a double helical toothing, which is also referred to as herringbone gearing, the extra deep toothing also has the advantage that the straight-cut toothing gearwheels which are used here can be manufactured by means of conventional fabrication processes and existing assembly processes can therefore be retained.

One development of the invention provides that the reducing gear is a planetary gear mechanism, with a sun gear, a ring gear and at least one planet gear, which is arranged between the sun gear and the ring gear and engages therewith. Planetary gear mechanisms have the advantage that they permit large transmission ratios and can therefore transmit large torques, since by virtue of the use of multiple planet gears, said torques are apportioned among said planet gears. The axles or shafts of the sun gear, of the ring gear and of the planet gear are usually parallel to one another, wherein that of the sun gear and of the ring gear can be coaxial. It is advantageous if both the sun gear, the ring gear and the at least one planet gear have the extra deep toothing. The sun gear, ring gear and planet gear form the gearwheels according to the invention here.

One development of the invention provides that the sun gear is arranged on the drive shaft in a rotationally fixed fashion, and/or the ring gear is arranged thereon in a fixed fashion. The sun gear is therefore assigned to the drive shaft and is attached thereto, with the result that it is possible to transmit a drive torque into the reducing gear. The drive shaft and the sun gear are therefore effectively connected. The ring gear can be arranged in a fixed fashion, that is to say in a nonrotatable fashion. The reducing gear is therefore driven via the drive shaft, which is connected to the sun gear. The output is provided via the at least one planet gear, which is rotatably arranged on a planet gear carrier. The planet gear carrier can be effectively connected to the driven shaft, that is to say connected in a rotationally fixed fashion. It is also possible to provide that the planet gear carrier is embodied in one piece with the driven shaft.

One development of the invention provides that the sun gear is embodied in one piece with the driven shaft. For example, the sun gear can already be formed on the drive shaft when the drive shaft is manufactured. In this way, there is no need to provide any attachment mechanisms in order to attach the sun gear to the drive shaft. This can contribute to reducing the weight of the drive shaft and therefore of the reducing gear.

One development of the invention provides that the at least one planet gear is rotatably arranged on a planet gear carrier. The planet gear carrier serves to mount the at least one planet gear in a rotatable fashion. The planet gear carrier can be mounted in a fixed or rotatable fashion. In the case of a planetary gear mechanism, either the ring gear or the planet gear carrier always has to be rotatably arranged. The planet gear carrier therefore holds the at least one planet gear between the sun gear and the ring gear so that the toothing of the planet gear can engage both with the sun gear and with the ring gear.

One development of the invention provides that the planet gear carrier is rotatably mounted and connected to the driven shaft in a rotationally fixed fashion, and in particular is embodied in one piece therewith. The output of the reducing gear, for example on the internal combustion engine side, therefore occurs via the planet gear carrier. For this purpose, the latter is rotatably mounted and has a rotationally fixed connection to the driven shaft. It may be particularly advantageous to embody the planet gear carrier in one piece with the driven shaft in order to achieve a reduction in weight of the reducing gear. For example, the reducing gear can have a rotationally fixed connection between the sun gear and the drive shaft as well as between the planet gear carrier and the driven shaft, while the ring gear is arranged in a fixed fashion.

One development of the invention provides that the extra deep toothing has an effective minimum profile coverage of approximately two or more than two between the sun gear and the planet gear and/or between the ring gear and the planet gear. A significant objective of the configuration of the extra deep toothing is to configure the tooth height in such a way that the uncorrected evolvent range brings about an effective minimum profile coverage of ≥2 between the sun gear and the at least one planet gear and between the at least one planet gear and the ring gear, respectively. This condition is met if the diameter of the reference circle $D_{Fa}$ is selected such that the engagement distance $g_a$ obeys the relation $g_a = 2 \cdot p_e$, where $p_e$ is the (end face) engagement pitch; the profile coverage $\epsilon_\alpha$ is the ratio of the engagement distance to the end face engagement pitch $p_e$. The end face engagement pitch $p_e = m \cdot \pi / \cos(\alpha)$ is the distance between two right-hand or left-hand edges on the engagement line. This can also be aimed at, for example, within the course of optimization of load-bearing capabilities. As a result, the requirements made in terms of optimum noise behavior and vibration behavior, on the one hand, and sufficient strength of the gearwheels, on the other, are met. The increase in the profile coverage occurs, inter alia, through the use of a reduced modulus for a specific transmission ratio at the gearwheel pair, which is confirmed by the following consideration: the modulus used has to be selected suitable for the strength so that sufficiently load-bearing tooth bases can be formed. The minimum usable modulus has been found experientially to be 0.5 mm. However, this value is only to be understood as a starting point since a lower modulus may be possible by using improved materials.

One development of the invention provides that the extra deep toothing has a normal engagement angle of 10° to 20°, preferably approximately 10° or approximately 16°. The reduction in the normal engagement angle for the extra deep toothing results in steeper edges, a larger profile coverage and smaller radial forces. Compared to a conventional geometry, the extra deep toothing is therefore less sensitive to wheel base deviations and out-of-true running errors, and the running is also made smoother. In toothings which are fabricated in a non-metal-removing fashion, the engagement angle can be reduced to approximately 10°, in particular if the profile coverage is ≥2. If the toothing is roller-milled, the engagement angle can be reduced, for example, as far as 16°. Through suitable measures, for example by increasing the strength by selecting a different material, the normal engagement angle can also assume smaller values than 10°.

One development of the invention provides that tooth bases of the extra deep toothing have a shape which deviates from a trochoidal shape. The tooth base radius of the toothing is reduced by the use of the relatively low modulus. This is compensated for with suitable measures. For example, in order to improve the strength of the tooth base, the shape of the tooth base can advantageously be replaced the conventional rounding of the tooth base by a corrected version. This is preferably done by retaining the fault-free engagement of the gearwheel pairs. At the same time, the optimized shape of the tooth base can deviate from the previous trochoidal shape.

One development of the invention provides that tooth heads of the extra deep toothing have a modified head region. In the tooth head region, the edge can be formed, for example, by a (slight) rounding of the head which is matched to the modulus used. Likewise, there may be provision for the head to be set back. Both measures permit a good lubrication film to be built up between the force-transmitting tooth edges. This leads to lower wear and reduced generation of noise.

One development of the invention provides that the extra deep toothing can be manufactured by means of a conventional fabrication process. The gearwheels which are provided with the extra deep toothing have the advantage compared, for example, to the double helical toothing that existing assembly processes can be retained. There is therefore no need to carry out or use any additional fabrication steps. This permits cost-effective manufacture of the reducing gear.

One development of the invention provides that a freewheel is assigned to the driven shaft. The freewheel can prevent the internal combustion engine which has already started from applying a high speed to the drive shaft of the reducing gear and thereby damaging, for example, an electric motor which is connected via said drive shaft. A one-sided transmission torque is therefore implemented by means of the freewheel, that is to say the torque can be transmitted only from the drive shaft to the driven shaft.

One development of the invention provides that the reducing gear has a starter pinion, in particular with helical toothing, which reducing gear can be engaged with a further gearwheel. The starter pinion is preferably provided on the driven shaft of the reducing gear. There is therefore no intention that the reducing gear or the driven shaft thereof is to be effectively connected on a continuous basis to the internal combustion engine—to which the other gearwheel can be assigned—or to some other device. Instead there is provision that the connection can be interrupted by means of the starter pinion. It is therefore possible, for example during a starting process of the internal combustion engine, to provide for torque to be transmitted from the drive shaft of the reducing gear to the internal combustion engine, while this connection is interrupted subsequent to the starting process. This is done by means of the starter pinion, which can be engaged with a further gearwheel which is assigned, for example, to the internal combustion engine or to the further device. The starter pinion particularly advantageously has a helical toothing for facilitating mutual engagement during operation. It is possible, for example, for the freewheel to be assigned to the starter pinion, or for these two elements to be structurally integrated.

One development of the invention provides at least one damping device which is assigned to the drive shaft and/or the driven shaft and/or the gearwheels. In order to improve the acoustic behavior, the reducing gear can be equipped with at least one damping device. The damping device serves to considerably reduce the vibration excitations which are caused, for example, by the internal combustion engine. Such a device can therefore make a significant contribution to reducing the noise level and the vibrations. In this context, the at least one damping device is assigned to the drive shaft and/or the driven shaft and/or the gearwheels of the reducing gear. The damping device is advantageously arranged between the reducing gear and the internal combustion engine or the further device, with the result that vibrations are already damped before the reducing gear is reached. This is beneficial for the service life of the gearwheels. A further improvement in the acoustic properties can be obtained by using multiple damping devices.

The invention also relates to a starter device of an internal combustion engine, having an electric motor by means of which the internal combustion engine can be started. A reducing gear, which is arranged between the electric motor and the internal combustion engine and is embodied, in particular, according to the statements above, is provided here.

BRIEF DESCRIPTION OF THE DRAWINGS

The invention will be explained in more detail below on the basis of exemplary embodiments illustrated in the drawing, without the invention being restricted. In said drawings.

DETAILED DESCRIPTION

Figure 1:
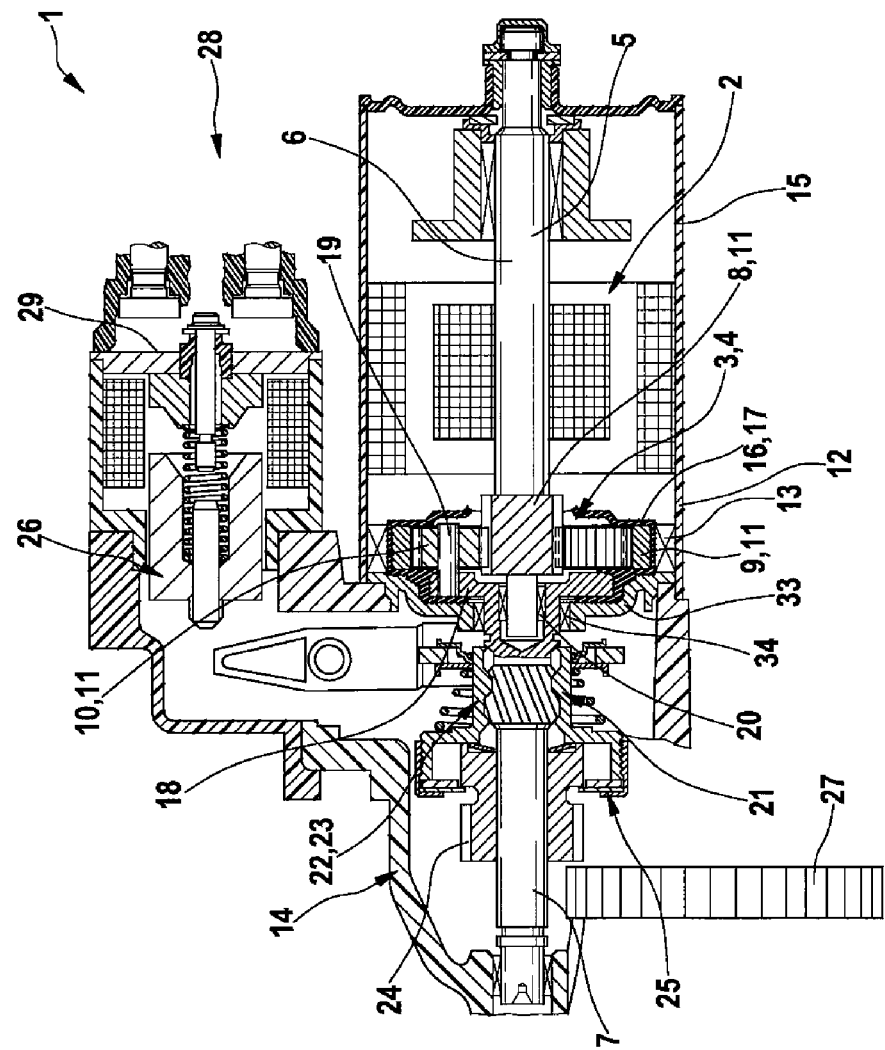
FIG. 1 shows a starter device of an internal combustion engine with a reducing gear.

FIG. 1 shows a starter device 1, also known as a starter, of an internal combustion engine (not illustrated), having an electric motor 2. The starter device 1 serves to start an internal combustion engine by means of the electric motor 2. An at least temporary effective connection is therefore provided between the electric motor 2 and the internal combustion engine. The starter device 1 has a reducing gear 3 which is embodied as a planetary gear mechanism 4. The latter is arranged between the electric motor 2 and the internal combustion engine. A drive shaft 5 of the planetary gear mechanism 4 is accordingly effectively connected to the electric motor 2 or to an armature shaft 6 of the electric motor 2 and can be embodied, in particular, in one piece therewith. On the side of the planetary gear mechanism 4 which is assigned to the internal combustion engine a driven shaft 7 is provided. The drive shaft 5 and the driven shaft 7 are effectively connected to one another via a sun gear 8, a ring gear 9 and three planet gears 10. The sun gear 8, the ring gear 9 and the planet gears 10 therefore form gearwheels 11 of the reducing gear 3. The latter are defined by the fact that they have straight-cut toothing and deep-cut toothing as toothing. The sun gear 8 is connected to the drive shaft 5 in a rotatably fixed fashion, and is embodied in one piece therewith in the illustrated example. In contrast, the ring gear 9 is secured in a fixed fashion, that is to say non-rotatably, in a housing 12 of the starter device 1. For this purpose, the ring gear 9 is provided in an intermediate bearing 13 which is arranged in a fixed and rotationally fixed fashion, for example in a drive bearing 14 or a pole housing 15. The intermediate bearing 13 can have, for example, a plastic bearing or metal bearing 33 and/or a bearing 34, the latter serving to guide the driven shaft 7 in a rotational fashion. The drive bearing 14 and pole housing 15 form components of the housing 12. The electric motor 2 is also provided in the pole housing 15. The ring gear 9 can be formed directly in the intermediate bearing 13 in order to implement a more cost-effective design of the planetary gear mechanism 4. However, the ring gear 9 can also be embodied as a single component and be introduced into the intermediate bearing 13. In this context, a damping device 16 can be arranged between the ring gear 9 and the intermediate bearing 13 in order to prevent or reduce a transmission of vibrations from the planetary gear mechanism 4 to the housing 12. The damping device 16 can be embodied, for example, as a damping rubber element 17. At least one planet gear 10, in the present example 3 thereof, is/are provided in the planetary gear mechanism 4. The number and the arrangement of the planet gears 10 of the planetary gear mechanism 4 is freely selectable and depends, for example, on the torque to be transmitted. The number of planet gears 10 is selected such that the strength of a toothing of the gearwheels 11 and of a planet gear carrier 18 of the planet gears 10 is ensured over a required service life. The planet gears 10 are rotatably arranged on the planet gear carrier 18. For this purpose, the planet gear carrier 18 forms, for example, pin-like elements 19 on which the planet gears 10 are mounted. The planet gear carrier 18 is connected in a rotatably fixed fashion to the driven shaft 7 and is embodied in one piece therewith in the illustrated example. In the driven shaft 7, a bearing 20 is provided which serves to mount the drive shaft 5. A driver 21, which is characterized by a tooth/shaft connection 22 of the helical toothing or straight-cut toothing design, is provided on the driven shaft 7. The tooth/shaft connection 22 which connects the driven shaft 7 and the driver 21 to one another constitutes what is referred to as a meshing mechanism 23. Clamping bodies (not illustrated) and a starter pinion 24 are installed in the driver 21. It therefore forms a freewheel 25 of the starter device 1. This starter device 1 is activated by means of an engagement relay 26 which presses the freewheel 25 in the direction of a gear rim 27 and at the same time activates a power supply 28 of the electric motor 2 via a contact bridge 29. The engagement relay 26 therefore closes the contact bridge 29 so that the electric motor 2 is supplied with power. The gear rim 27 is assigned to the internal combustion engine, and the latter can therefore be driven by means of said gear rim 27. If the freewheel 25 is pressed in the direction of the gear rim 27, the starter pinion 24 can mesh with the gear rim 27 and therefore bring about a connection between the electric motor 2 and the internal combustion engine. In the process, as the driven shaft 7 rotates the starter pinion 24 experiences a feed motion either by means of the helically toothed tooth/shaft connection 22 at the driven shaft 7 or at the driver 21 or by means of the helical toothing at the starter pinion 24.

Figure 2:
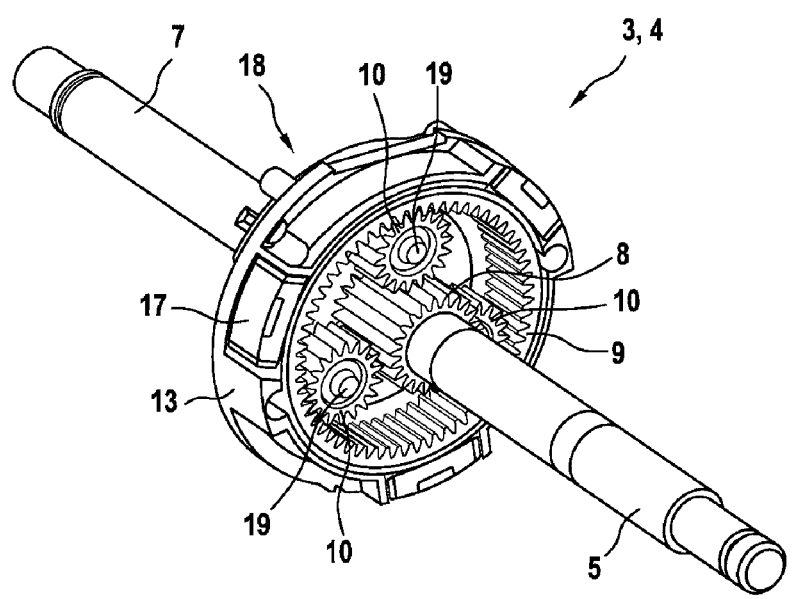
FIG. 2 shows a perspective illustration of the reducing gear which is embodied as a planetary gear mechanism.

FIG. 2 shows a isometric illustration of the reducing gear 3 in the form of the planetary gear mechanism 4. The drive shaft 5, which at the same time forms the armature shaft 6 of the electric motor 2 (not illustrated here) is illustrated. The drive shaft 5 is embodied in one piece with the sun gear 8 of the planetary gear mechanism 4. Said planetary gear mechanism 4 engages with three planet gears 10 which are rotatably arranged on the planetary gear carrier 18 or the pin-shaped elements 19 thereof. The planetary gear carrier 18 is embodied in one piece with the driven shaft 7 and is therefore connected thereto in a rotationally fixed fashion. The planet gears 10 also engage with the ring gear 9, which is arranged in the intermediate bearing 13, wherein the damping rubber 17 ensures that the vibrations which are transmitted to the housing 12 (not illustrated) are reduced.

Figure 3:
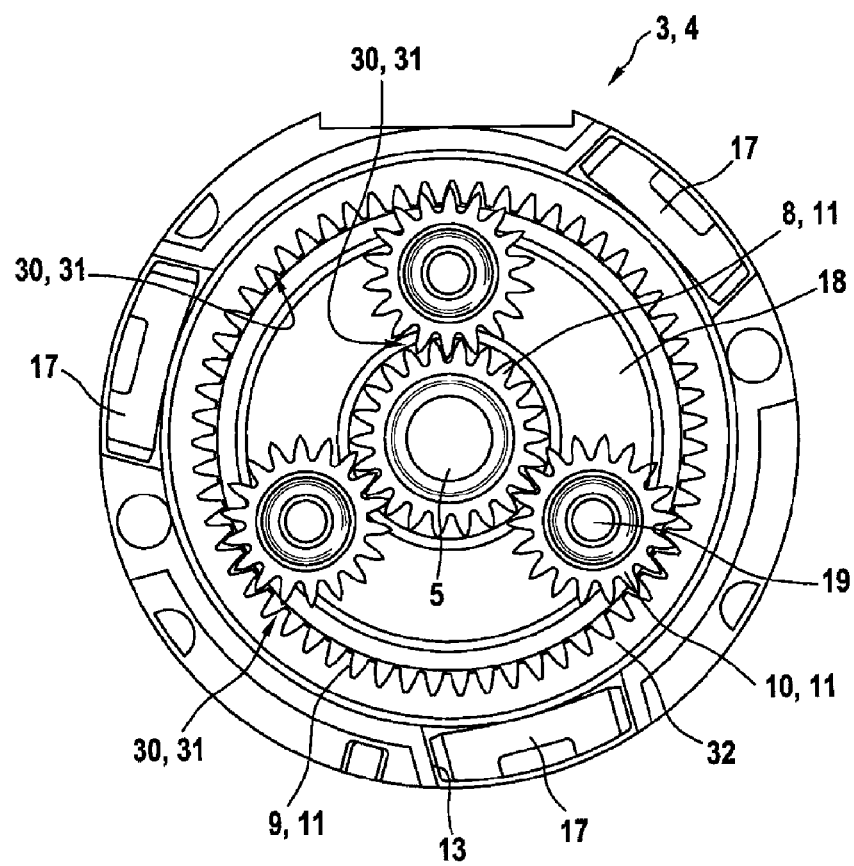
FIG. 3 shows a side view of the planetary gear mechanism.

FIG. 3 shows a side view of the planetary gear mechanism 4 from the position of the electric motor 2. The drive shaft 5 can be seen again with the sun gear 8 formed thereon and the planetary gear carrier 18 with pin-shaped elements 19 which are attached thereto and on which the planet gears 10 are rotatably arranged. The ring gear 9 which is arranged in the intermediate bearing 13 and which has the damping rubber 17 is also illustrated. The planetary gear carrier 18 is embodied in one piece with the driven shaft 7. This illustration shows that the gearwheels 11 have a toothing 30 which is embodied as an extra deep toothing 31. The extra deep toothing 31 is characterized by the fact that it has an effective minimum profile coverage of ≥2, which is implemented by a normal engagement angle of 10° to 20°. In this context, a tooth base 32 can deviate from a trochoidal shape. The tooth base 32 is illustrated as being associated with the ring gear 9 here, but it can also be provided on any of the gearwheels 11.

As a result, the function of the starter device 1 is as follows: in order to start the internal combustion engine the engagement relay 26 is first switched on, and said engagement relay 26 energizes the electric motor 2 of the starter device 1 via a contact bridge 29. This results in a torque being generated by the electric motor 2, which torque sets the armature shaft 6 in rotational motion. The armature shaft 6 forms here the drive shaft 5 of the planetary gear mechanism 4, with the result that the latter is also driven. This occurs, by virtue of the fact that the drive shaft 5 drives the sun gear 8, which engages with three planet gears 10. The latter engage in turn with the ring gear 9 and are attached to the planetary gear carrier 18, which is consequently set in rotational motion. The planetary gear carrier 18 is embodied in one piece with the driven shaft 7, with the result that the latter is driven. The engagement relay 26 moves the freewheel 25 further in the direction of the gear rim 27, with the result that the starter pinion 24 can mesh in the gear rim 27. In this way, an effective connection is produced between the electric motor 2 and the internal combustion engine, and the torque of the electric motor 2 can drive the latter. In this way, the internal combustion engine is started and subsequently the effective connection between the electric motor 2 and the internal combustion engine is interrupted again through the disengagement of the starter pinion 24 from the gear rim 27 as soon as the engagement relay 26 is deactivated.

The invention claimed is:

1. A reducing gear (3) for speed-reducing coupling of a drive shaft and a driven shaft (5, 7), by means of at least two gearwheels (11) which engage with one another, characterized in that the gearwheels (11) have straight-cut toothing and the toothing (30) is extra deep toothing (31), wherein the reducing gear (3) is a planetary gear mechanism (4), with a sun gear (8), a ring gear (9) and at least one planet gear (10), which is arranged between the sun gear (8) and the ring gear (9) and engages therewith, and wherein the extra deep toothing (31) has an effective minimum profile coverage of at least two between the sun gear (8) and the planet gear (10).

2. The reducing gear of claim 1, characterized in that the extra deep toothing (31) has an effective minimum profile coverage of at least about two between the ring gear (9) and the planet gear (10).

3. The reducing gear as claimed in claim 1, characterized in that the sun gear (8) is arranged on the drive shaft (5) in a rotationally fixed fashion and the ring gear (9) is fixed relative to the sun gear (8).

4. The reducing gear as claimed in claim 1, characterized in that the sun gear (8) is embodied in one piece with the drive shaft (5).

5. The reducing gear as claimed in claim 1, characterized in that the at least one planet gear (10) is rotatably arranged on a planet gear carrier (18).

6. The reducing gear as claimed in claim 5, characterized in that the planet gear carrier (18) is rotatably mounted and connected to the driven shaft (7) in a rotationally fixed fashion.

7. The reducing gear of claim 6, characterized in that the planet gear carrier (18) and the driven shaft (7) are formed together as one piece.

8. The reducing gear as claimed in claim 1, characterized in that the extra deep toothing (31) has a normal engagement angle of 10° to 20°.

9. The reducing gear as claimed in claim 8, characterized in that the extra deep toothing (31) has a normal engagement angle of one of approximately 10° and approximately 16°.

10. The reducing gear as claimed in claim 1, characterized in that tooth heads of the extra deep toothing (31) have a modified head region.

11. The reducing gear as claimed in claim 1, characterized in that the extra deep toothing (31) can be manufactured by means of a conventional fabrication process.

12. The reducing gear as claimed in claim 1, characterized in that a freewheel (25) is assigned to the driven shaft (7).

13. The reducing gear as claimed in claim 1, characterized in that the reducing gear (3) has a starter pinion (24), which reducing gear (3) can be engaged with a further gearwheel (27).

14. The reducing gear as claimed in claim 13, characterized in that the starter pinion (24) has helical toothing.

15. The reducing gear as claimed in claim 1, characterized in that tooth bases (32) of the extra deep toothing (31) have a shape which deviates from a trochoidal shape.

16. The reducing gear as claimed in claim 1, characterized in that the reducing gear is part of a starter device (1) of an internal combustion engine.

17. The reducing gear as claimed in claim 1, characterized by at least one damping device (16) which is assigned to at least one of the drive shaft (5), the driven shaft (7) and the gearwheels (11).

18. A starter device (1) of an internal combustion engine, the starter device having an electric motor (2) by means of which the internal combustion engine can be started, the starter device further including a reducing gear (3) provided between the electric motor (2) and the internal combustion engine, the reducing gear operable as a speed-reducing coupling of a drive shaft and a driven shaft (5, 7), by means of at least two gearwheels (11) which engage with one another, characterized in that the gearwheels (11) have straight-cut toothing and the toothing (30) is extra deep toothing (31), wherein the reducing gear (3) is a planetary gear mechanism (4), with a sun gear (8), a ring gear (9) and at least one planet gear (10), which is arranged between the sun gear (8) and the ring gear (9) and engages therewith, and wherein the extra deep toothing (31) has an effective minimum profile coverage of at least two between the sun gear (8) and the planet gear (10).

\* \* \* \* \*